United States Patent
Shibata (10) Patent No.: US 8,014,244 B2
(45) Date of Patent: Sep. 6, 2011

(54) OPTICAL DISK REPRODUCTION APPARATUS AND OPTICAL DISK REPRODUCING METHOD

(75) Inventor: Makoto Shibata, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 716 days.

(21) Appl. No.: 12/146,604

(22) Filed: Jun. 26, 2008

(65) Prior Publication Data
US 2009/0003166 A1 Jan. 1, 2009

(30) Foreign Application Priority Data
Jun. 29, 2007 (JP) ................................. 2007-173280

(51) Int. Cl.
*G11B 7/00* (2006.01)
(52) U.S. Cl. .................................... 369/53.11; 369/53.2
(58) Field of Classification Search ............... 369/53.11, 369/53.2, 30.03, 53.22, 53.27; 348/14.05; 340/12.22; 345/173
See application file for complete search history.

(56) References Cited

U.S. PATENT DOCUMENTS
2006/0050142 A1* 3/2006 Scott et al. ................. 348/14.05
2006/0087445 A1* 4/2006 Green ....................... 340/825.22

FOREIGN PATENT DOCUMENTS
JP 2005-027114 1/2005

* cited by examiner

*Primary Examiner* — Ali Neyzari
(74) *Attorney, Agent, or Firm* — Pillsbury Winthrop Shaw Pittman, LLP (57) ABSTRACT

According to one embodiment, a reproduction apparatus includes an execution unit configured to execute an advanced application, a detection unit configured to detect a series of keys which are operated by a user while the advanced application is executed, a recording unit configured to record key macro information formed of the detected series of keys and operation timings of the series of keys, and a key event generating unit configured to read the key macro information recorded by the recording unit and to generate a series of key events corresponding to the series of keys at the operation timings.

8 Claims, 6 Drawing Sheets

"fast-forwarding" is normally performed

FIG. 7

OPTICAL DISK REPRODUCTION APPARATUS AND OPTICAL DISK REPRODUCING METHOD

CROSS-REFERENCE TO RELATED APPLICATIONS

This application is based upon and claims the benefit of priority from Japanese Patent Application No. 2007-173280, filed Jun. 29, 2007, the entire contents of which are incorporated herein by reference.

BACKGROUND

1. Field

One embodiment of the present invention relates to an optical disk reproduction apparatus such as a DVD (Digital Versatile Disk) player.

2. Description of the Related Art

In the reproduction of advanced content of HD DVD (High Definition Digital Versatile Disc), for the purpose of various interactive settings by a user, an advanced application using an ECMA script and a markup language is executed. For instance, a user can customize a content reproducing method (such as language selection, display method, and audio selection). However, when content reproduction is temporarily stopped, and then started again, if an application that explicitly stores setting information in the ECMA script or the markup language is not provided, the setting content (setting of the customized reproducing method) is reset.

In this way, the advanced application using the ECMA script and the markup language is executed, whereby various customizations depending on content are realized. However, it is impossible to provide a setting storage function in a generic format applicable to all the applications, because the program itself of the ECMA script should be analyzed.

Meanwhile, a key macro function that stores a procedure of key operation by a user to repeatedly reproduce the key operation is described in Japanese Patent Application KOKAI Publication No. 2005-27114 (paragraph 0041). In this document, when a user operates an operation key of a remote control device or the like in the reproduction of an optical disk to select and reproduce a favorite scene or tune, the procedure of the key operation by the user is stored, whereby when the optical disk having been reproduced one time is reproduced again, the optical disk can be reproduced in accordance with the stored key operation. Therefore, when a user operates the operation key of the remote control device or the like in the reproduction of the optical disk to select and reproduce a favorite scene or tune, the procedure of the key operation by the user is stored, whereby when the optical disk having been reproduced one time is reproduced again, the optical disk can be reproduced in accordance with the stored key operation.

However, in the key macro function described in Japanese Patent Application KOKAI Publication No. 2005-27114, the reproduction of each scene or tune is completed in the reproduction of the optical disk, and then when a scene or tune to be reproduced next time is selected by a numeric key, the key macro function simply stores the operation order of the numeric key. When the reproduction of each scene and tune is completed during the second or more reproduction of the optical disk, the key macro function selects the next scene and tune in accordance with the stored operation order of the numeric key. Meanwhile, in the advanced application, also in the case where the timings of different or the same applications are different, different definitions may be given to the same key. For instance, a B key becomes a determination key or a bookmark registration key depending on the timing, and therefore the selection operation cannot be reproduced simply by storing a type of the operated key.

In the reproduction of the advanced content of HD DVD in the prior art, the advanced application realizes that the user can perform various settings by the interactive operation. However, if the application that stores the setting content is not provided, the setting content is reset, whereby the same operation should be performed again.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. For example, a personal computer with reproduction software installed therein falls under the category of the optical disk reproduction apparatus of the invention. As information recorded in a recording media, needless to say, in addition to video information, document information and the like may be recorded in the recording media. In general, according to one embodiment of the invention, a reproduction apparatus for an optical disk having advanced contents stored therein, comprising an execution unit configured to execute an advanced application, a detection unit configured to detect a series of keys which are operated by a user while the advanced application is executed, a recording unit configured to record key macro information formed of the detected series of keys and operation timings of the series of keys, and a key event generating unit configured to read the key macro information recorded by the recording unit and to generate a series of key events corresponding to the series of keys at the operation timings.

Figure 1:
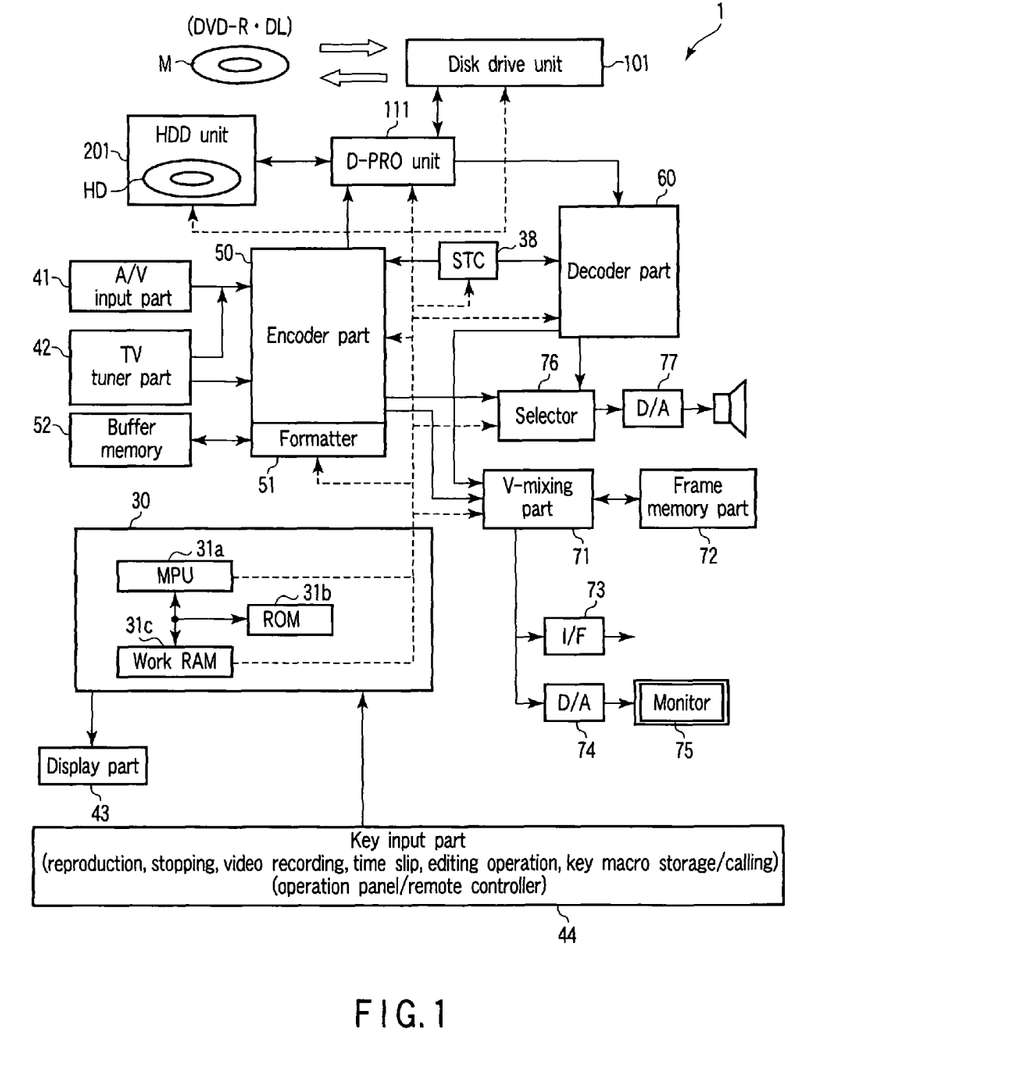
FIG. 1 is an exemplary block diagram showing a configuration of an information recording/reproduction apparatus according to one embodiment of the invention.

FIG. 1 is a view showing a configuration of an information recording/reproduction apparatus according to the first embodiment of the invention. A digital video recorder is described as an example of the embodiment. In FIG. 1, although an optical disk with an HD DVD standard and a hard disk mounted in a hard disk device are provided as a recording media, for example a semiconductor memory (memory card)

can be used as the recording media, in place of the hard disk or the optical disk such as a DVD.

An information recording/reproduction apparatus (video recorder) 1 has a disk drive 101 capable of establishing a video file in, for example, an optical disk (medium) M with an HD DVD standard. The optical disk M may have a CD standard or a DVD standard, and may be a Blu-Ray disk. Further, the optical disk M may be a multilayer disk (for example, double-layered DL) in addition to a single layer disk.

The disk drive 101 has, detailed description of which will be omitted here, a rotation control system for rotating the optical disk M at a predetermined speed, a laser drive system that applies laser light having a predetermined wavelength for recording of information on a recording surface of the optical disk M or reproduction of information recorded in the optical disk M, a laser optical system that guides the laser light, and so on.

The information recording/reproduction apparatus (video recorder) 1 can establish a video file in a hard disk HD accommodated in a hard disk device (hereinafter referred to as HDD) 201 as with the case of the optical disk M.

The data (recording data) to be recorded in the hard disk HD of the optical disk M or the HDD 201 mounted in the disk drive 101 is recorded in a predetermined recording media (optical disk M or hard disk HD) by the control of a data processor (D-PRO) unit 111. Further, the recorded data is read out from the optical disk M in the disk drive 101 or the hard disk HD in the HDD 201 by the control of the data processor unit 111 (reproduction data is obtained).

The data processor unit 111 deals the recording data or the reproduction data as a predetermined size and includes a buffer circuit, a modulation/demodulation circuit, an error correction part, and so on.

The information recording/reproduction device 1 has, as main components, an encoder 50 which is a data processing part for recording input information, a decoder 60 which is a data processing part which reproduces data already recorded, and a microcomputer block 30 which controls the operation of the information recording/reproduction device 1.

The encoder 50 has a video and audio A/D converter which digitizes an input analogue video signal and an analogue audio signal, a video encoder, an audio encoder, and a sub picture encoder.

The output of the encoder 50 is converted into a format of a predetermined DVD-RAM in a formatter 51 including a buffer memory to be supplied to the data processor unit 111.

An external analogue video signal and an external analogue audio signal from an AV input device 41 or an analogue video signal and an analogue audio signal from a TV tuner 42 are input into the encoder 50.

When a compressed digital video signal and a compressed digital audio signal are directly input into the encoder 50, the compressed digital video signal and the compressed digital audio signal can be directly supplied to the formatter 51. Further, the encoder 50 can directly supply an A/D converted digital video signal and audio signal to a video mixing part 71 and an audio selector 76.

The encoder 50 includes a video encoder (not shown). In the video encoder, a digital video signal is converted into a digital video signal compressed at a variable bit rate, on the basis of, for example, MPEG-2 or MPEG-1 standard. Further, the digital audio signal is converted into a digital audio signal, which is compressed at a fixed bit rate on the basis of, for example, MPEG-2, MPEG-1 or AC-3 standard, or converted into an uncompressed digital audio signal such as a linear PCM.

When a sub picture signal (for example, a signal from a video player provided with an independent output terminal for the sub picture signal provided therein) is directly input through an AV (audio and video) input device 41, or when a broadcasting signal of a DVD video signal having the equivalent data structure has been received in the TV tuner 42, the sub picture signal in the DVD video signal is encoded (subjected to run length encoding) by the sub picture encoder, and thus a bit map of the sub picture (sub picture data) is constructed.

The encoded digital video signal and digital audio signal and the sub picture data are packed by the formatter 51 into a video pack, an audio pack and a sub picture pack. The packed video pack, audio pack and sub picture pack are further grouped (aggregated), and then converted into a format specified by the DVD-video standard (DVD Video format) or a format specified by the DVD recording standard (DVD VR format).

The information formatted by the formatter 51 (that is, the packs of the video, audio and sub picture data, and so on) and management information (file system) produced by an MPU (CPU) 31*a* (described later) are supplied to the HDD 201 or disk drive 101 through the data processor unit 111, where the data can be recorded on the hard disk HD or the optical disk M. It should be noted that the data recorded on the hard disk HD or the optical disk M can be replaced with each other or duplicated through the data processor unit 111. In other words, the data already recorded on the hard disk HD can be moved to or duplicated onto the optical disk M, and the data recorded on the optical disk M can be moved to or duplicated onto the hard disk HD, as well.

Further, the data recorded on the hard disk HD or optical disk M, that is, for example, a video object of a program can be edited in such a way that a portion of or whole program is deleted, or an arbitrary number of objects are synthesized (connected). This is because the data unit handled by the format according to the embodiment of the invention is defined, whereby the editing is facilitated.

The microcomputer block 30 includes a main control unit including, for example, an MPU (micro-processing unit) or CPU (central processing unit) 31*a*, a ROM (read only memory) 31*b* that holds control programs that operate various elements of the MPU (CPU) 31*a* and the information recording/reproduction device 1, control blocks, and so on, and a RAM (random access memory) 31*c* that provides a predetermined work area to be secured to execute a program.

In the microcomputer block 30, using the RAM 31*c* as the work area, the MPU (CPU) 31*a* performs detection of a defected portion, detection of an unrecorded area, setting of a position where video recording information is recorded, UDF recording, setting of an AV address, or the like, in accordance with the control program stored in the ROM 31*b*.

The microcomputer block 30 has a directory detection part, a VMG information (entire video manager information) production part, a copy (duplication)-related information detection part, a copy (duplication)/scrambling information processing part (RDI processing part), a packet header processing part, a sequence header processing part, an aspect ratio information processing part, and other units. The microcomputer block 30 further includes a recording management information control part (hereinafter referred to as video recording management control part) operated when recording (video recording) of information (data) is performed, and an editing management information control part (hereinafter referred to as editing management control part) operated when editing of recorded data is performed.

The contents of the results executed by the MPU (CPU) 31a to be notified to the user are displayed in the display unit 43 of the information recording/reproduction device 1 or OSD-displayed (on-screen displayed) on a monitor (to be connected as an external device, which will be described later).

Further, the microcomputer block 30 includes a key input device 44 enabling input of a control signal from the user for operating the information recording/reproduction device 1, that is, an operation signal, to the microcomputer block 30. The key input unit 44 corresponds to operation switches provided at arbitrary positions of the information recording/reproduction device 1 or to a remote control device (not shown) that can input an operation signal through a remote control receiving part (not shown). The key input device 44 may be a personal computer that can input a control signal to the information recording/reproduction device 1 via wire, radio or optical means (including infrared ray means), and so on. That is, regardless of the form of the key input device 44, the user operates the key input device 44, whereby the video recording processing of input video and audio signals, reproduction processing of video-recorded contents, editing processing of the video-recorded contents, and other processings are performed.

The microcomputer block 30 controls the disk drive 101, the HDD 201, the data processor unit 111, the encoder 50, the decoder 60, and the like at the timing determined based on the time data from an STC (System Time Clock) 38. The operation of recording and reproduction are usually executed in synchronization with the time clock from the STC 38. Other operations may be executed at the timing independent of the STC 38.

The decoder 60 includes, detailed description of which will be omitted here, a separator that separates and takes out respective packs from a DVD format signal having a pack structure, a memory used for the separation of packs and other signal processings, a V-decoder that decodes main video data (the content of the video pack) separated by the separator, an SP decoder that decodes a sub picture data (the content of the sub picture pack) separated by the separator, and an A-decoder that decodes audio data (the content of the audio pack) separated by the separator.

The decoder 60 has a video processor which synthesizes decoded sub picture image with decoded main video image at a predetermined timing and outputs and superposes a menu, a highlight button, subtitles (text display of audio data) and other sub picture images on a main video image.

An output video signal of the decoder 60 is input into a video mixing (V-mixing) part 71. The V-mixer 71 synthesizes text data with a main video image with the sub picture image synthesized therewith. The V-mixer 71 is connected with a line into which signals from the TV tuner 42 and A/V input device 41 can be directly input.

The V-mixer 71 is connected with a frame memory 72 used as a buffer, an I/F (Interface) 73 used for output of an analog signal in the output of an output signal from the V-mixer 71, and a D/A converter (Digital-Analog converter) 74 used for output of a digital signal. The output video signal is converted into an analogue signal by the D/A converter 74 to be displayed in a monitor 75.

An audio signal output from the decoder 60 is input into a D/A converter (Digital-Analog converter) 77 through a selector 76 to be converted into an analog signal by the D/A converter 77, and, thus, to be output to the outside. By way of an example, when a speaker is connected to an output end of the D/A converter 77 through an amplifier (not shown), the user can listen to audio data (sound). The selector 76 is controlled by a select signal from the microcomputer block 30. Thereby, the selector 76 can supply the digital signal (not required to be processed by the encoder), which is supplied from the TV tuner 42 and the A/V input device 41 and has passed through the encoder 50, directly to the D/A converter 77.

The formatter 51 of the encoder 50 produces various segmentation information during data recording (video recording), and periodically sends the information (information at the time of interruption to the beginning of GOP) to the MPU (CPU) 31a of the microcomputer block 30. The segmentation information includes the number of packs of VOBU, end address of I picture from the beginning of VOBU, and reproducing time of VOBU.

The formatter 51 supplies the aspect ratio information from the aspect ratio information processing part to the MPU (CPU) 31a at the start of video recording. Based on this information, the MPU (CPU) 31a produces VOBU stream information (STI) on the basis of this information. The STI includes resolution data and aspect data. Each decode part is initialized based on these data at the time of reproduction.

In the information recording/reproduction device 1, one video file is recorded in one disk. A unit (size) of minimal continued information is determined in order to prevent the images being reproduced from interrupting during the access (seeking) of data. This unit is called CDA (Contiguous Data Area). The CDA size is a multiple number of ECC (Error Correction Code) block (16 sectors), and used as a recording unit in a file system.

The data processor unit 111 receives data of VOBU unit from the formatter 51 of the encoder 50 to supply the data of CDA unit to the disk drive 101 or the HDD 201. The MPU (CPU) 31a of the microcomputer block 30 produces management information required for reproducing recorded data to recognize a data recording completion command indicating the completion of data recording, and, thus, to send the produced management information to the data processor unit 111.

The management information is recorded in a recording media (optical disk M or hard disk HD). Therefore, at the timing of encoding, the MPU (CPU) 31a can receive information of data unit (for example, segmentation information) from the encoder 50. At the time of starting recording, the MPU (CPU) 31a recognizes the management information (file system) read from the optical disk M or the hard disk HD and recognizes an unrecorded area of each disk to set a recorded area on data in a disk through the data processor unit 111.

Next, the reproduction operation of this embodiment is described.

As described above, when the advanced application is executed in the reproduction of the advanced content of HD DVD, the various interactive settings by a user, such as background color setting and language setting can be realized. In order to realize these settings, several times of key operation should be performed at a predetermined timing in accordance with the transition of a screen. Since these settings are different in each disk, the settings are performed at every insertion of a disk. It is complicated to perform the several times of key operation at every insertion of a disk, and thus, the key macro function that stores a procedure of the key operation is realized in the invention.

Since a well-known key macro function simply stores "key type/key depression order," such a key macro function cannot store the interactive key operation in the execution of the advance application on the basis of the following reason. The key macro function according to one embodiment of the invention stores "time interval of depression of each key," "Disc ID," and "Application ID being reproduced" in addition to "key type/key depression order."

The reason why "time interval of depression of each key" is required is as follows: in short, since the state of the advanced application varies from hour to hour with the passage of real time, if it is not conscious of the variation of the state, the same operation is not always executed even by pressing the same key. More specifically, there arises the following problem in each ECMA script and the markup language.

The processing of the ECMA script is basically performed by event driven. For instance, when the reproduction instruction of sound effects is issued, a callback function is called at a timing of the actual start of the reproduction or at a timing of the completion of the reproduction. It is general that the state of the inside of the script is changed within the callback function. Therefore, the state is not changed unless the callback is returned, and thus, in order to perform the key operation after the recognition of the change in the state, it is necessary to send a key event after the call back has been returned.

Although the markup language is periodically processed, there is a concept of "active period" with reference to the actual time. Specifically, the concept means "the markup language is in a state A for three seconds after key depression, and the state A is changed to a state B three seconds later." In this case, in order to perform key operation in the state B, the key event should be sent after waiting at least three seconds from the key depression.

The reason why "Disk ID" and "Application ID being reproduced" are required is as follows. A plurality of the advanced applications can exist at the same time, and in addition, the event processing order is defined. The key event is basically transmitted in sequence from the top application to the lowest application. However, the propagation of the event can be stopped (Stop Propagation, Prevent Default) in accordance with DOM-Level 2 Event definition. This processing is performed, whereby the event propagation to the application lower than the own application can be stopped.

Specifically, for instance, the application displaying instructions of the basic operation of a key is supposed to be being reproduced. Further, it is supposed that when a fast-forward (FF) key is depressed during the reproduction of this application, "operating instruction of fast-forwarding" is displayed on a screen. Moreover, a processing for stopping the propagation of the fast-forward key is supposed to be provided in this application. In this case, the fast-forward key is depressed, whereby although the operating instruction of fast-forwarding is displayed, the actual fast-forward operation is not performed. However, when the fast-forward key is depressed without this application, only the fast-forwarding operation is normally performed. The operation between the cases with and without this application is totally different for an end user.

Thus, it is necessary to specify the application being reproduced. The application being reproduced can be uniquely discriminated from "Disk ID" and "Application ID being reproduced." "Application ID being reproduced" can be uniquely discriminated from a number of a title being reproduced and each Z-order for all the active applications. Here, with regard to the Z-order for the active application, when there are plural applications in one title, since the Z-order is determined in each application, the application can be specified by the Z-order, in addition to the title number. By way of an example, content can be described so that applications different in each language are activated in the same title. Namely, since all the applications in a title are not always executed, the application ID being reproduced is required to be maintained.

The key macro function of this embodiment is described as follows.

Figure 2:
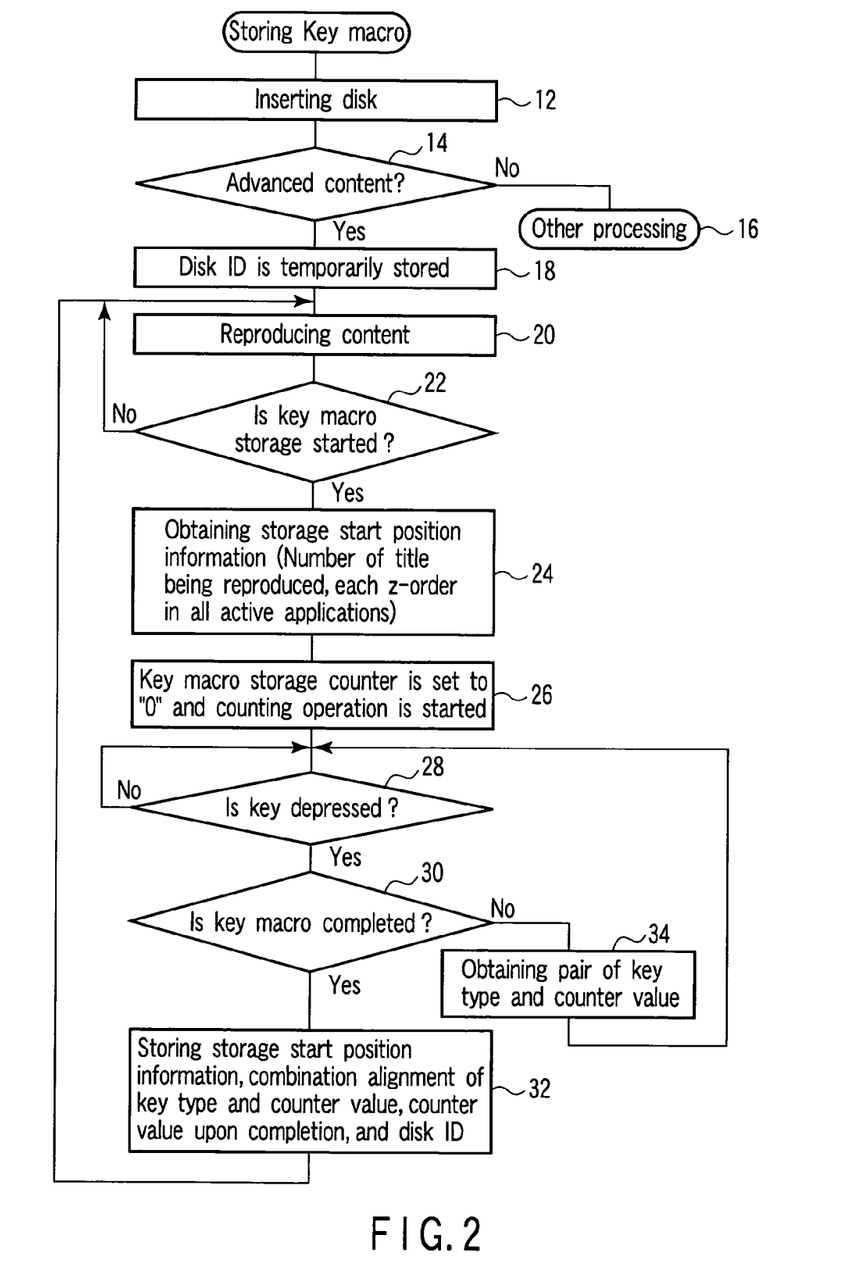
FIG. 2 is an exemplary flowchart showing a key macro storage operation in one embodiment of the invention.

FIG. 2 is a flowchart showing an operation of storing a key macro.

In a block 12, a disk is inserted into the disk drive 101. In a block 14, the disk drive 101 determines whether or not the relevant disk has the advanced content stored therein on the basis of the presence or absence of a specified folder and a specified file. When the advanced content is not stored in the disk, that is, when only standard content is stored in the disk, it is inapplicable to the invention, and therefore other processing (processing in the standard content) is performed in a block 16.

When the advanced content is stored in the disk, a disk ID is read out in a block 18. Since the disk ID can be specified from copy control information (CCI) of AACS (Advanced Access Content System) and provider ID/content ID, these information are read out to be temporarily stored.

In a block 20, the advanced content is reproduced. In a block 22, it is determined whether or not the instruction of starting of the key macro storing is issued. When the start instruction is not issued, the processing is returned to the content reproduction (block 20). When the start instruction is issued, storage start position information is obtained in a block 24. The storage start position information includes the disk ID temporarily stored in the block 18, the number of the title being reproduced, and each Z-order for all the active applications.

In a block 26, a key macro storage counter is set to "0," and then a count operation is started. This is because, since the state of the advanced application is varying, the meaning of the key operation is different in accordance with the timing of the key operation (time from the start of key macro storing).

In a block 28, it is determined whether or not the key operation is present. When there is no key operation, the block 28 is repeated many times. When there is the key operation, it is determined whether or not a completion instruction of the key macro storing is issued (block 30). When the completion instruction is not issued, a pair of a key type and a counter value is obtained in a block 34, and then the processing is returned to the block 28. When the completion instruction is issued, the storage start position information (obtained in the block 24), alignment of the pair of the key type and the counter value (obtained in the block 34), a count value upon completion are stored as key macro information (block 32), and then the processing is returned to the reproduction of the content (block 20). Since there is a case in which plural key macro information are recorded in the same disk ID, a label (name) such as a background color setting macro is provided in the key macro information. A storage destination of the key macro information is a nonvolatile memory or a backed up memory (not shown) in the MPU 31a. In a recording-type disk, the key macro information may be directly in the disk.

Figure 3:
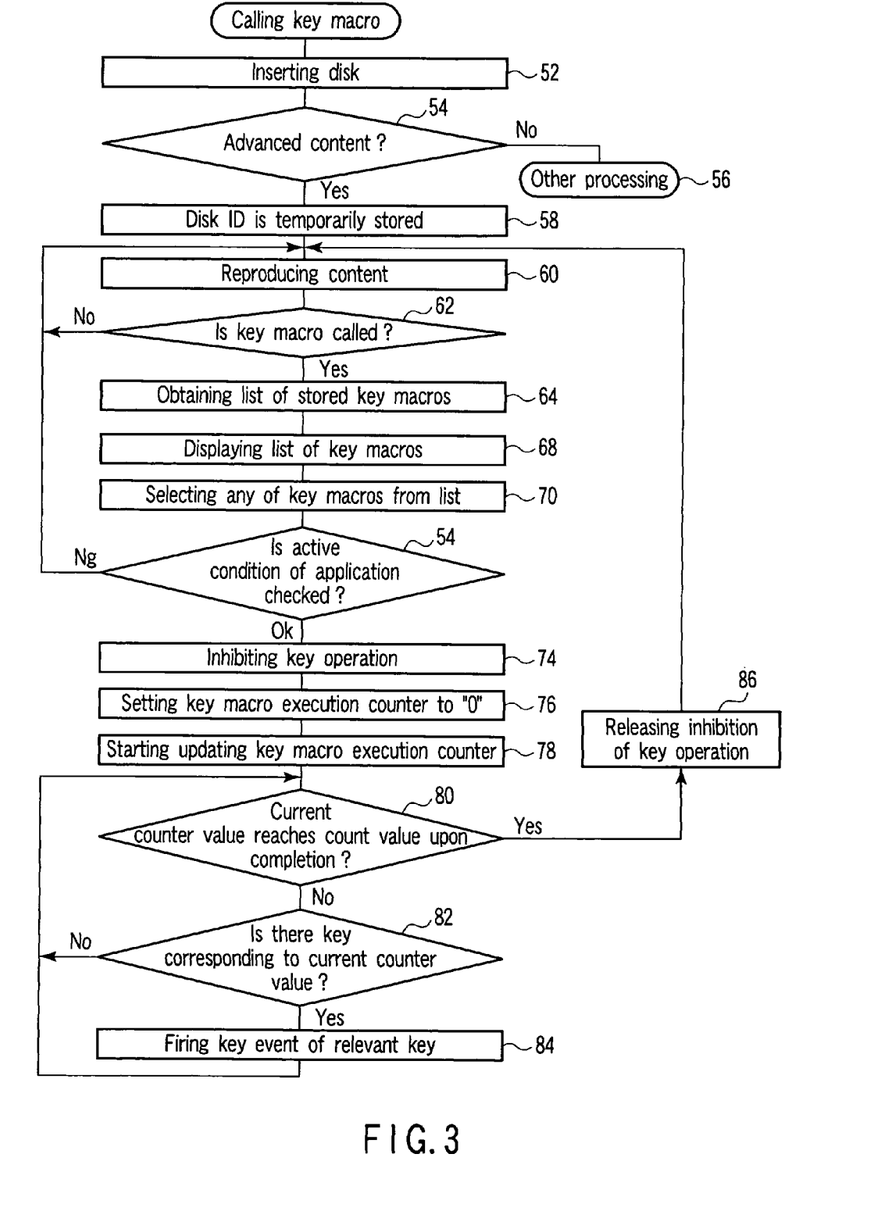
FIG. 3 is an exemplary flowchart showing a key macro call operation in one embodiment of the invention.

FIG. 3 is a flowchart showing an operation of calling the key macro.

In a block 52, a disk is inserted into the disk drive 101. In a block 54, the disk drive 101 determines whether or not the relevant disk has the advanced content stored therein on the basis of the presence or absence of a specified folder and a specified file. When the advanced content is not stored in the disk, that is, when only the standard content is stored in the disk, it is inapplicable to the invention, and therefore other processing (processing in the standard content) is performed in a block 56.

When the advanced content is stored in the disk, a disk ID is read in a block 58. Since the disk ID can be specified from copy control information (CCI) of AACS and provider ID/content ID, these information are read out and stored temporarily.

In a block 60, the advanced content is reproduced. In a block 62, it is determined whether or not the instruction of calling of the key macro is issued. When the call instruction is not issued, the processing is returned to the reproduction of the content (block 60). When the call instruction is issued, a list of stored key macro information about the relevant disk ID is obtained in a block 64.

In a block 68, a list of the key macros is displayed. A user selects an intended key macro from the displayed list of the key macros in a block 70.

In a block 72, the active condition of the application is checked. It is determined whether or not the active application defined by the selected key macro information and the current active application coincide with each other. When they do not coincide with each other, the processing is returned to the block 60, while when they coincide with each other, the processing proceeds to a block 74. In the determination of the coincidence, strictly speaking, all the elements of the application coincide with those of the current active application; however, in the actual content, even if all the elements of these applications do not coincide with each other, the intended operation is often performed as a result. Therefore, it is considered that an alarm message such as "If this key macro is executed, unintended operation may be performed" is displayed. When the end user selects "OK," the processing proceeds to the block 74.

In the block 74, the key operation by a user is inhibited. This is because, if the end user operates a key during the execution of the key macro, an extra key event is added, whereby it is highly likely that the intended operation is not performed. However, the inhibition of the key operation is not automatically set, but it may be allowable that "key operation inhibition/permitting" is selected in the GUI by the end user.

In a block 76, a count value of a key macro execution counter is set to "0." In a block 78, updating of the key macro execution counter is started. The key macro storage counter and the key macro execution counter have the same timing measurement function. These counters may be the same counters and may be updated by the same clock.

In a block 80, it is determined whether or not the current count value of the key macro execution counter reaches the count value upon completion of the key macro stored in the block 32 of FIG. 2. When the current count value does not reach the count value upon completion of the key macro, it is determined whether or not the pair of the key type and the counter value corresponding to the current counter value exists in the key macro information (block 82). When the pair exists in the key macro information, the key event corresponding to the relevant key type is fired (block 84), and then the processing is returned to the block 80. When it is determined that the pair does not exist in the key macro information in the block 82, the processing is returned to the block 80 without firing the key event. Thus, the key operation performed upon storing of the key macro is reproduced at that timing in that order, whereby the key macro is executed.

In the block 80, when it is determined that the current count value reaches the count value upon completion of the key macro, since this means that the execution of the key macro is completed, the inhibition of the key operation is released in a block 86, and then the processing is returned to the content reproduction (block 60).

An example of the key macro of a specific application is described with reference to FIGS. 4 to 7.

Figure 4:
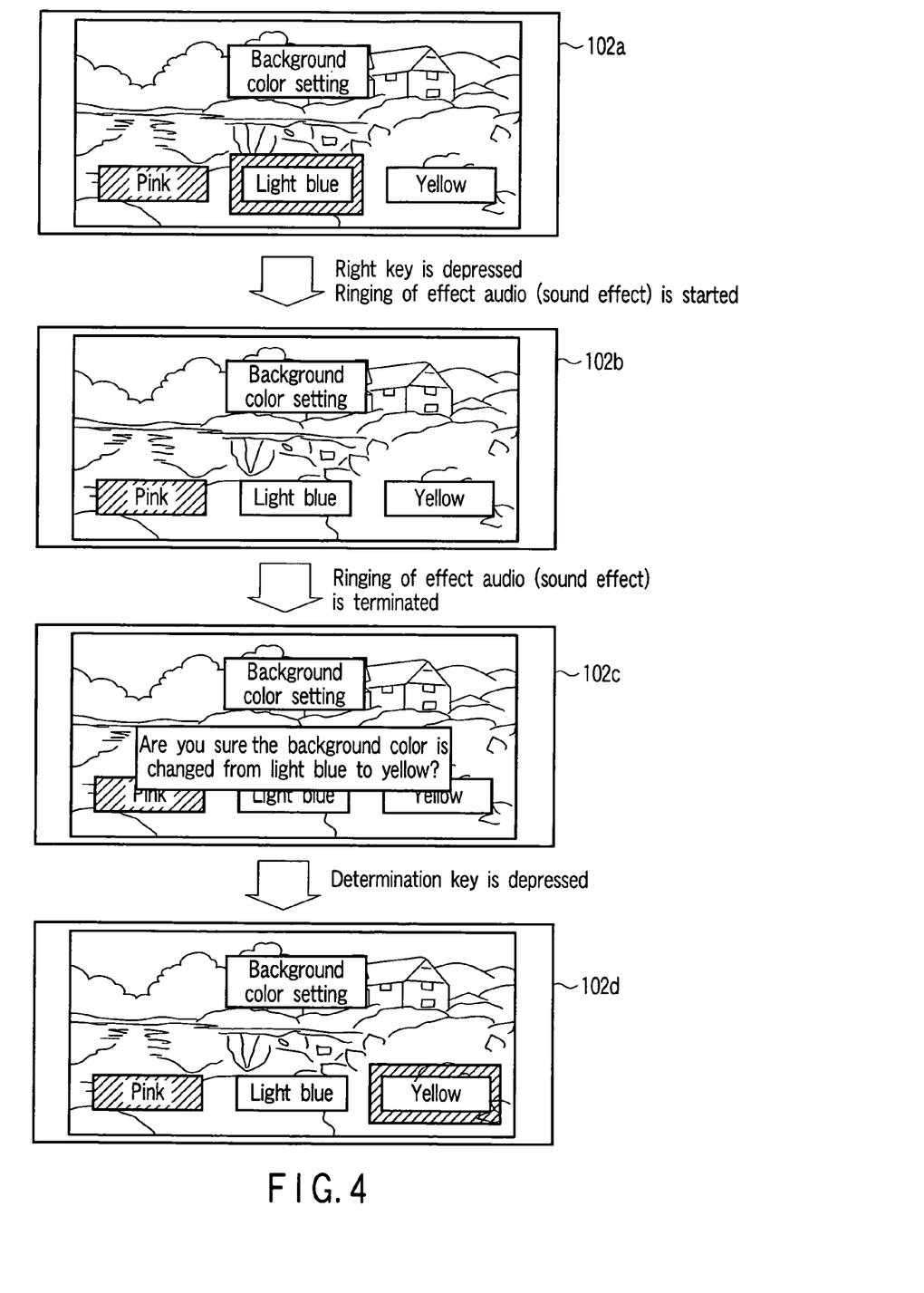
FIG. 4 is an exemplary schematic view showing a background color setting operation as an example of an ECMA script in one embodiment of the invention.

FIG. 4 shows a key macro of a background color setting application described by the ECMA script. A light blue button is focused on an initial screen 102*a*. When the focus is changed to a yellow button provided on the right side of the light blue button, a right key is operated. When the right key is operated, an effect sound (effect audio) such as a bell sound sounds for a predetermined period (for example, two seconds). As shown in a screen 102*b*, any button is not focused during the ringing of the effect sound. In order to prevent from receiving the key operation (for example, a determination key) during the ringing of the effect sound, the description by the ECAM script: "key operation is ignored during the ringing of the effect sound" is executed. When the ringing of the effect sound is terminated, the state is transmitted by an event handler, and then, a message of "Are you sure the background color is changed from light blue to yellow?" is displayed on a screen 102*c*. When the determination key is operated in response to this message, the background color is changed to yellow, whereby the yellow button is focused as shown in a screen 102*d*. Therefore, even if the determination key is operated during the ringing of the effect sound, the fired key event is not handled, whereby this key operation is aborted. The key event corresponding to the determination key is properly handled only when the determination key is operated after the termination of the ringing of the effect sound.

Figure 5:
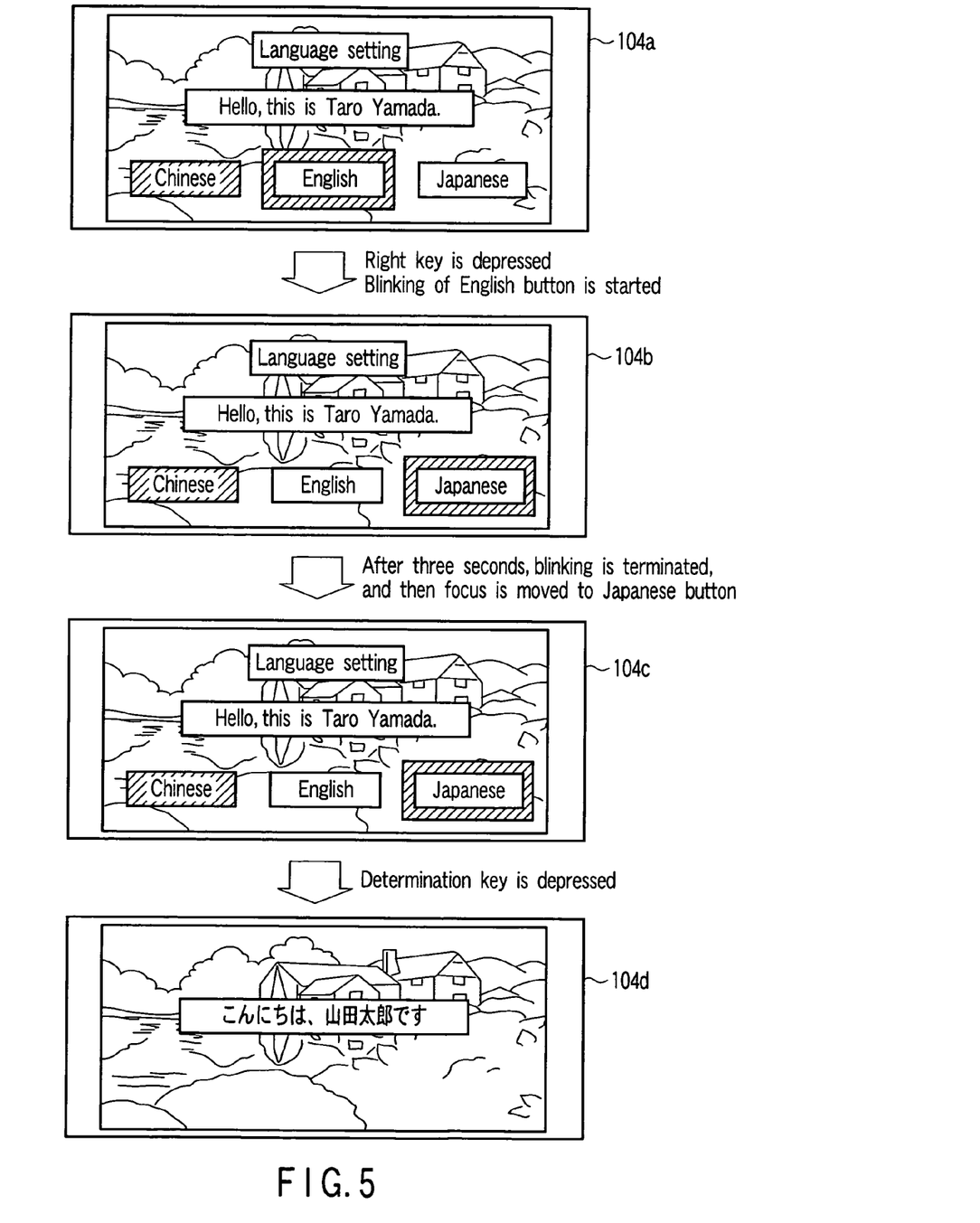
FIG. 5 is an exemplary schematic view showing a language setting operation as an example of a markup language in one embodiment of the invention.

FIG. 5 shows a key macro of a language setting application described by the markup language. Firstly, in an initial screen 104*a*, an English button is focused. When the focus is changed to a Japanese button provided on the right side of the English button, a right key is operated. Thereby, the Japanese button blinks for a predetermined period (for example, three seconds) as shown in a screen 104*b*. Since the English button is focused during this blinking, if the determination key is operated at this stage, the English button is selected. The focus is transferred to the Japanese button after the blinking, as shown in a screen 104*c*. Thereafter, when the determination key is operated, the fired key event is properly handled, and the Japanese button is selected as shown in a screen 104*d*.

As shown in FIGS. 4 and 5, even if the key event to be fired by the key operation is different depending on the time of the key operation, the key macro information of this embodiment includes the pair of the key type and the counter value, whereby the key event firing at a proper timing can be realized.

Figure 6:
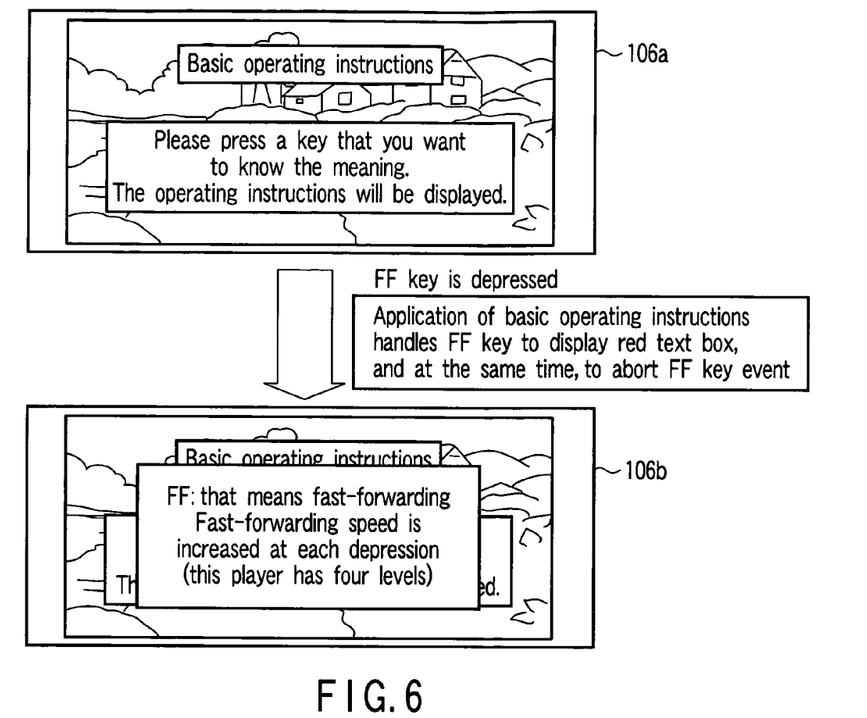
FIG. 6 is an exemplary schematic view showing an example of an application in one embodiment of the invention.

FIG. 6 shows a key macro in a case in which a "Basic operating instructions" application is active. In an initial screen 106*a*, a message of "Please press a key that you want to know the meaning. The operating instructions will be displayed." is displayed. Here, when for example an FF key is operated, the "Basic operating instructions" application handles the FF key to display a text box in a predetermined color (for example, red) including the operating instructions of the FF key is displayed in a screen 106*b*, and, at the same time, an FF key event is aborted.

Figure 7:
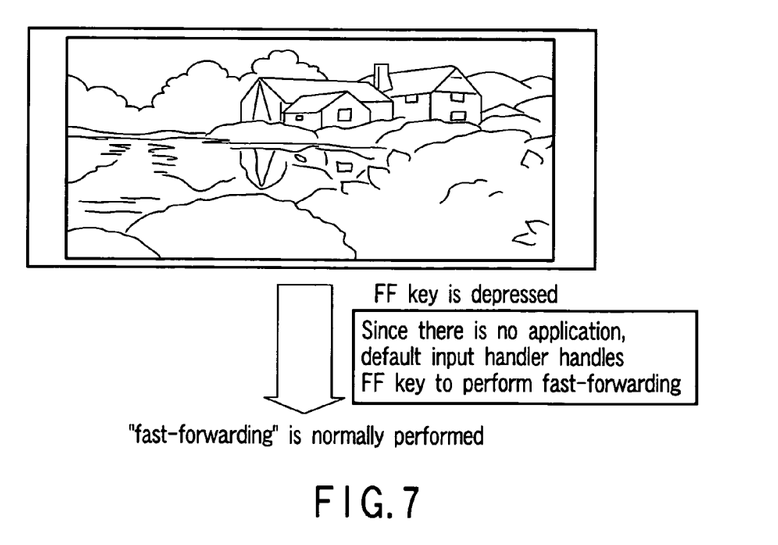
FIG. 7 is an exemplary schematic view showing an example of an application in one embodiment of the invention.

Meanwhile, FIG. 7 shows a key event in a case in which there is no "Basic operating instructions" application. When the FF key is operated during the reproduction of content, if there is no "Basic operating instructions" application, a default input handler handles the FF key to execute fast-forwarding.

As shown in FIGS. 6 and 7, even in the same key (FF key), or even if the active applications are different from each other in the key operation, the key macro information of this embodiment includes the application ID, whereby delivery of a proper key event to an expected application can be realized.

As described above, according to the embodiment, in the reproduction of the HD DVD advanced content, the interactive operation procedure performed by a user is stored by the advanced application, and the stored procedure is called when the same application is executed again, whereby the operation procedure having been performed by the user can be automatically reproduced. According to the embodiment, the key macro function can be realized, and setting requiring the same key operation each time can be automated also in the HD DVD advanced content. In addition, it can contribute to the development efficiency such as the automation of a test.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A reproduction apparatus for an optical disk having advanced contents stored therein, comprising:
    an execution unit configured to execute an advanced application;
    a detection unit configured to detect a series of keys which are operated by a user while the advanced application is executed;
    a recording unit configured to record key macro information formed of the detected series of keys and operation timings of the series of keys; and
    a key event generating unit configured to read the key macro information recorded by the recording unit and to generate a series of key events corresponding to the series of keys at the operation timings.

2. The reproduction apparatus according to claim 1, wherein the recording unit records items of key macro information in association with identification information of an optical disk and identification information of an application, and
    the key event generating unit reads one or more items of the key macro information corresponding to the identification information of the optical disk and the identification information of the advanced application, and, if items of the key macro information are read, selects one of the items of the key macro information.

3. The reproduction apparatus according to claim 1, wherein the recording unit comprises a storage counter configured to measure an elapsed time from a start of record of a key macro information, and detects an operation timing from a count value of the storage counter, and
    the key event generating unit comprises an execution counter configured to measure an elapsed time from a start of execution of the key macro and detects the operation timings based on a count value of the execution counter.

4. The reproduction apparatus according to claim 2, wherein the identification information of the application is obtained from a title number of a title being reproduced and a Z-order of an active application.

5. A reproduction method for an optical disk having advanced contents stored therein, comprising:
    executing an advanced application;
    detecting a series of keys which are operated by a user while the advanced application is executed; and
    recording key macro information formed of the detected series of keys and operation timings of the series of keys.

6. The reproduction method according to claim 5, further comprising:
    reading the recorded key macro information; and
    generating a series of key events corresponding to the series of keys at the operation timings.

7. The reproduction method according to claim 5, wherein recording comprises recording items of key macro information in association with identification information of an optical disk and identification information of an application,
    the reading comprises reading one or more items of the key macro information corresponding to the identification information of the optical disk and the identification information of the advanced application, and, if items of the key macro information are read, selecting one of the items of the key macro information.

8. The reproduction method according to claim 5, wherein the recording comprises measuring an elapsed time from a start of record of a key macro information, and detecting an operation timing from the measured elapsed time, and
    the generating comprises measuring an elapsed time from a start of execution of the key macro and detecting the operation timings based on the measured elapsed time from the start of execution of the key macro.

* * * * *